(12) United States Patent
Kitada et al.

(10) Patent No.: US 10,718,403 B1
(45) Date of Patent: Jul. 21, 2020

(54) ROTARY DEVICE

(71) Applicant: EXEDY Corporation, Neyagawa-shi, Osaka (JP)

(72) Inventors: Kenji Kitada, Neyagawa (JP); Yusuke Tomita, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 0 days.

(21) Appl. No.: 16/715,279

(22) Filed: Dec. 16, 2019

(30) Foreign Application Priority Data

Feb. 22, 2019 (JP) .................. 2019-030258

(51) Int. Cl.
*F16F 15/14* (2006.01)
*F16H 45/02* (2006.01)

(52) U.S. Cl.
CPC .... *F16F 15/145* (2013.01); *F16H 2045/0226* (2013.01); *F16H 2045/0263* (2013.01)

(58) Field of Classification Search
CPC .... F16F 15/14; F16F 15/1407; F16F 15/1414; F16F 15/1421; F16F 15/145; F16F 15/1457; F16H 41/24; F16H 45/02; F16H 2045/0226; F16H 2045/0263
See application file for complete search history.

(56) References Cited

U.S. PATENT DOCUMENTS

| 2,451,513 | A | * | 10/1948 | Salomon | F16F 15/14 464/65.1 |
| 5,996,761 | A | * | 12/1999 | Teramae | F16H 45/02 192/205 |
| 6,089,121 | A | * | 7/2000 | Lohaus | F16F 15/1407 464/68.4 |
| 6,106,400 | A | * | 8/2000 | Mizukami | F16F 15/1234 464/68.92 |
| 9,605,729 | B2 | * | 3/2017 | Kawahara | F16F 15/1428 |
| 10,047,844 | B2 | * | 8/2018 | Tomiyama | F16H 45/02 |
| 10,487,911 | B2 | * | 11/2019 | Tomiyama | F16F 15/134 |
| 10,495,178 | B2 | * | 12/2019 | Tomita | F16F 15/1204 |
| 10,508,708 | B1 | * | 12/2019 | Tomiyama | F16F 15/145 |
| 2017/0045113 | A1 | * | 2/2017 | Ito | F16F 15/12373 |

FOREIGN PATENT DOCUMENTS

| DE | 102011103471 | A1 | * | 12/2011 | .......... | F16F 15/1421 |
| DE | 102014221689 | A1 | * | 4/2016 | .......... | F16F 15/14 |
| DE | 102016217542 | A1 | * | 3/2017 | .......... | F16F 15/145 |
| DE | 102016212975 | A1 | * | 1/2018 | .......... | F16F 15/145 |

(Continued)

*Primary Examiner* — Adam D Rogers
(74) *Attorney, Agent, or Firm* — United IP Counselors, LLC (57) ABSTRACT

A rotary device includes a first rotor, a centrifugal element, a first urging member, and a second urging member. The first rotor includes a guide surface and is disposed to be rotatable. The centrifugal element is attached to the first rotor. The centrifugal element is radially movable along the guide surface by a centrifugal force acting thereon in rotation of the first rotor. The first urging member is configured to urge the centrifugal element. The second urging member is configured to urge the centrifugal element in a direction opposite to a direction of urging by the first urging member. The first and second urging members are further configured to rotate the centrifugal element toward the guide surface.

6 Claims, 8 Drawing Sheets

(56) References Cited

FOREIGN PATENT DOCUMENTS

| | | | | |
|---|---|---|---|---|
| DE | 102016223124 A1 | * | 5/2018 | .............. F16F 15/14 |
| DE | 102017114676 A1 | * | 1/2019 | ............ F16F 15/145 |
| DE | 102018205149 A1 | * | 10/2019 | ............ F16F 15/131 |
| FR | 868223 A | * | 12/1941 | .............. F16F 15/14 |
| FR | 3057929 A1 | * | 4/2018 | ............ F16F 15/145 |
| GB | 584849 A | * | 1/1947 | .............. F16F 15/14 |
| JP | 2017-053467 A | | 3/2017 | |
| JP | 2019052714 A | * | 4/2019 | |

* cited by examiner

ROTARY DEVICE

CROSS-REFERENCE TO RELATED APPLICATIONS

This application claims priority to Japanese Patent Application No. 2019-030258, filed Feb. 22, 2019. The contents of that application are incorporated by reference herein in their entirety.

TECHNICAL FIELD

The present invention relates to a rotary device.

BACKGROUND ART

There has been known a type of rotary device in which centrifugal elements are attached to a rotor rotated about a rotational axis. The rotary device exerts a function when a centrifugal force acts on each centrifugal element in rotation of the rotor. The rotary device described above is exemplified by a torque fluctuation inhibiting device.

For example, as described in Japan Laid-open Patent Application Publication No. 2017-53467, the torque fluctuation inhibiting device inhibits torque fluctuations when a centrifugal force acts on each centrifugal element. Detailedly, the torque fluctuation inhibiting device includes an inertia ring, centrifugal elements and cam mechanisms. The inertia ring is rotatable relative to a hub flange to which a torque is transmitted, and the centrifugal force acts on each centrifugal element in rotation of the hub flange and the inertia ring. Each cam mechanism includes a cam provided on the surface of each centrifugal element and a cam follower making contact with the cam.

When the hub flange and the inertia ring are circumferentially displaced by torque fluctuations, each cam mechanism is actuated in response to the centrifugal force acting on each centrifugal element. Then, each cam mechanism converts the centrifugal force into a circumferential force directed to reduce the displacement between the hub flange and the inertia ring. Torque fluctuations are inhibited by this circumferential force.

In the torque fluctuation inhibiting device described in Japan Laid-open Patent Application Publication No. 2017-53467, the hub flange is provided with recessed portions in the outer peripheral part thereof. The recessed portions are opened radially outward. The centrifugal elements are accommodated in the recessed portions, respectively, and are radially movable therein. Each recessed portion is defined by inner wall surfaces. Two of the inner wall surfaces face the circumferential direction, and function as guide surfaces in radial movement of each centrifugal element. Gaps are produced between the guide surfaces and each centrifugal element.

With the gaps produced between each centrifugal element and the guide surfaces, each centrifugal element is tilted or circumferentially moved during actuation of the torque fluctuation inhibiting device. The tilt and movement of each centrifugal element depend on the orientation of the circumferential force acting on each centrifugal element. When each centrifugal element is tilted or circumferentially moved, the profile of the cam provided on the surface of each centrifugal element is inevitably changed from a profile planned in design phase. This results in inability of stably obtaining a characteristic planned in design phase in the torque fluctuation inhibiting device.

Thus, the gaps produced between each centrifugal element and the guide surfaces pose a drawback that a characteristic of the rotary device cannot be stably obtained. In view of this, it is an object of the present invention to stabilize the characteristic of the rotary device.

BRIEF SUMMARY

A rotary device according to an aspect of the present invention includes a first rotor, a centrifugal element, a first urging member and a second urging member. The first rotor includes a guide surface. The first rotor is disposed to be rotatable. The centrifugal element is attached to the first rotor. The centrifugal element is radially movable along the guide surface by a centrifugal force acting thereon in rotation of the first rotor. The first urging member urges the centrifugal element. The second urging member urges the centrifugal element in a direction opposite to a direction of urging by the first urging member. The first and second urging members rotate the centrifugal element toward the guide surface.

According to this configuration, the centrifugal element is rotated toward the guide surface by the first and second urging members. Because of this, even during actuation of the rotary device, the centrifugal element and the guide surface are kept in contact with each other without producing a gap therebetween. In other words, the centrifugal element can be kept in the same posture during actuation of the rotary device. As a result, the characteristic of the rotary device can be stabilized. Additionally, the direction of urging by the first urging member and the direction of urging by the second urging member are oriented opposite from each other. Because of this, urging forces applied to the centrifugal element from the first and second urging members are canceled out, whereby it is possible to inhibit impact applied to the centrifugal element by the urging forces of the first and second urging members.

Preferably, the rotary device further includes a second rotor and a cam mechanism. The second rotor is disposed to be rotatable with the first rotor and be rotatable relative to the first rotor. The cam mechanism receives the centrifugal force acting on the centrifugal element. Additionally, when a relative displacement is produced between the first rotor and the second rotor in a circumferential direction, the cam mechanism converts the centrifugal force into a circumferential force directed to reduce the relative displacement.

According to this configuration, when a torque is inputted to the first or second rotor, the first and second rotors are rotated. When the torque inputted to the first or second rotor does not fluctuate, relative displacement is not produced between the first rotor and the second rotor in the circumferential direction. On the other hand, when the torque inputted to the first or second rotor fluctuates, relative displacement is produced between the first rotor and the second rotor in the circumferential direction (the displacement will be hereinafter expressed as "rotational phase difference" on an as-needed basis) depending on the extent of torque fluctuations, because the second rotor is disposed to be rotatable relative to the first rotor.

When the first and second rotors are herein rotated, a centrifugal force acts on the centrifugal element. Then, when the relative displacement is produced between the first rotor and the second rotor in the circumferential direction, the cam mechanism converts the centrifugal force acting on the centrifugal element into the circumferential force. The circumferential force acts to reduce the relative displacement between the first rotor and the second rotor. Torque fluctuations are inhibited by the herein described actuation of the cam mechanism.

The centrifugal force acting on the centrifugal element is herein used as a force for inhibiting torque fluctuations. Hence, a characteristic of inhibiting torque fluctuations varies in accordance with the rotational speed of the first rotor. Additionally, the characteristic of inhibiting torque fluctuations can be appropriately set by, for instance, the shape of a cam or so forth. Hence, a peak of torque fluctuations can be reduced in as wide a rotational speed range as possible.

Preferably, the centrifugal element includes a guide member that makes contact with the guide surface.

Preferably, the first rotor includes a guide member that, in part, forms the guide surface.

Preferably, the centrifugal element includes a centrifugal element body, a first arm portion and a second arm portion. The first arm portion extends from the centrifugal element body. The second arm portion extends from the centrifugal element body in a direction opposite to an extending direction of the first arm portion. The first urging member urges the first arm portion. The second urging member urges the second arm portion.

Preferably, the first urging member urges the centrifugal element radially outward. Additionally, the second urging member urges the centrifugal element radially inward.

Preferably, the rotary device further includes a block mechanism. The block mechanism blocks the second urging member from applying an urging force to the centrifugal element when the centrifugal element is moved radially inward more than a predetermined distance. According to this configuration, the second urging member is blocked from applying the urging force to the centrifugal element when the centrifugal element is moved radially inward more than the predetermined distance. Because of this, a radially outward load acting the centrifugal element is relatively increased in magnitude, whereby the first and second rotors can be prevented from being excessively displaced relative to each other.

Overall, according to the present invention, the characteristic of the rotary device can be stabilized.

DETAILED DESCRIPTION

Figure 1:
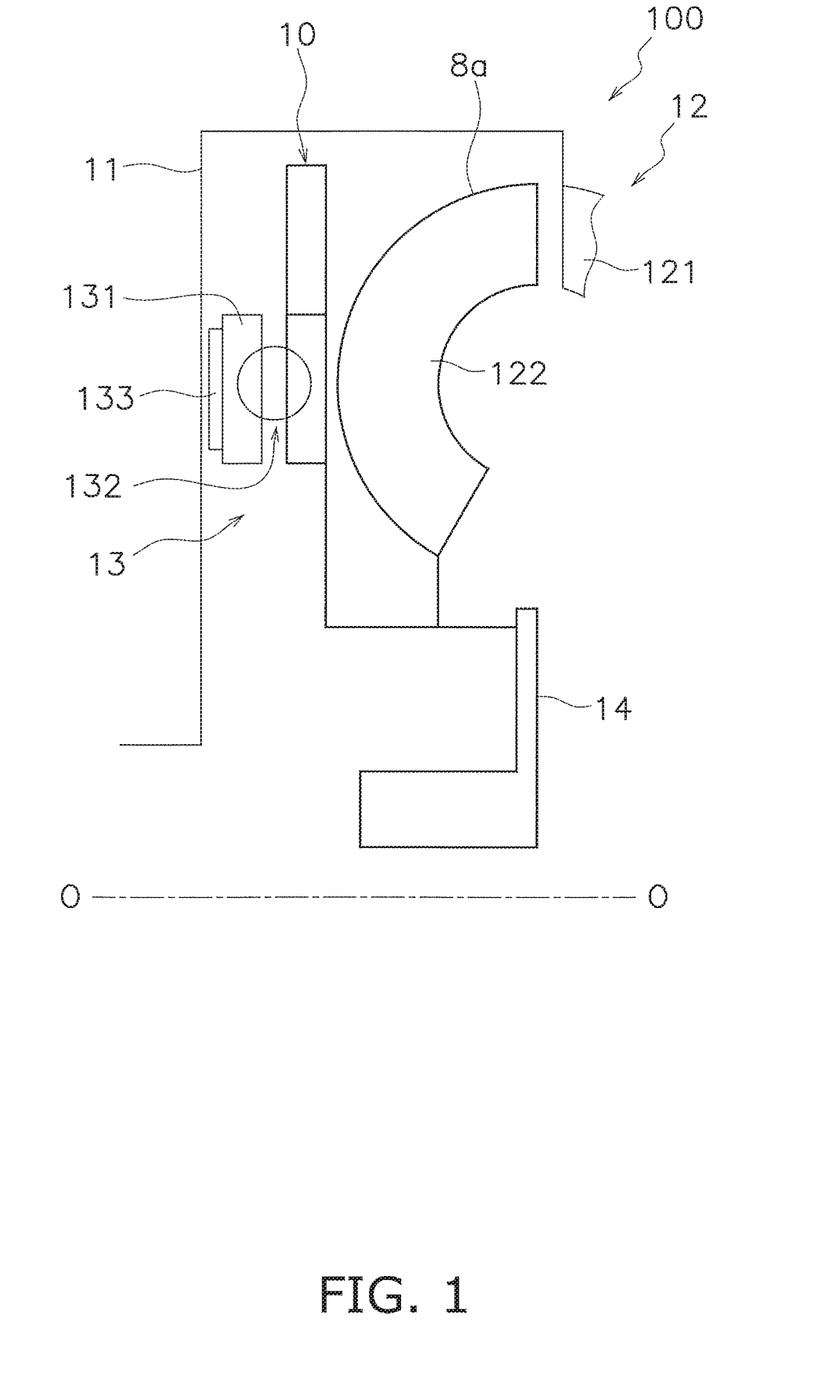
FIG. 1 is a schematic diagram of a torque converter.

A torque fluctuation inhibiting device, which is a preferred embodiment of a rotary device according to the present invention, will be hereinafter explained with reference to drawings. FIG. 1 is a schematic diagram of a condition that the torque fluctuation inhibiting device according to the present preferred embodiment is attached to a lock-up device for a torque converter. It should be noted that in the following explanation, the term "axial direction" refers to an extending direction of a rotational axis O of the torque fluctuation inhibiting device. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on a centrifugal element in FIG. 2. Likewise, the radial direction is not required to be perfectly matched with a diameter direction of the imaginary circle about the rotational axis O, and is conceptualized as encompassing, for instance, an up-and-down direction defined based on the centrifugal element in FIG. 2.

[Entire Configuration]

As shown in FIG. 1, a torque converter 100 includes a front cover 11, a torque converter body 12, a lock-up device 13 and an output hub 14. A torque is inputted to the front cover 11 from an engine. The torque converter body 12 includes an impeller 121 coupled to the front cover 11, a turbine 122 and a stator (not shown in the drawings). The turbine 122 is coupled to the output hub 14. An input shaft of a transmission (not shown in the drawings) is spline-coupled to the output hub 14.

[Lock-Up Device 13]

The lock-up device 13 includes a clutch part, a piston to be actuated by hydraulic pressure, and so forth, and can be set to a lock-up on state and a lock-up off state. In the lock-up on state, the torque inputted to the front cover 11 is transmitted to the output hub 14 through the lock-up device 13 without through the torque converter body 12. On the other hand, in the lock-up off state, the torque inputted to the front cover 11 is transmitted to the output hub 14 through the torque converter body 12.

The lock-up device 13 includes an input-side rotor 131, a damper 132 and a torque fluctuation inhibiting device 10.

The input-side rotor 131 includes the piston axially movable, and is provided with a friction member 133 fixed to the front cover 11-side lateral surface thereof. When the friction member 133 is pressed onto the front cover 11, the torque is transmitted from the front cover 11 to the input-side rotor 131.

The damper 132 is disposed between the input-side rotor 131 and a hub flange 2 (to be described). The damper 132 includes a plurality of torsion springs, and elastically couples the input-side rotor 131 and the hub flange 2 in the circumferential direction. The damper 132 transmits the torque from the input-side rotor 131 to the hub flange 2, and also, absorbs and attenuates torque fluctuations.

[Torque Fluctuation Inhibiting Device 10]

Figure 2:
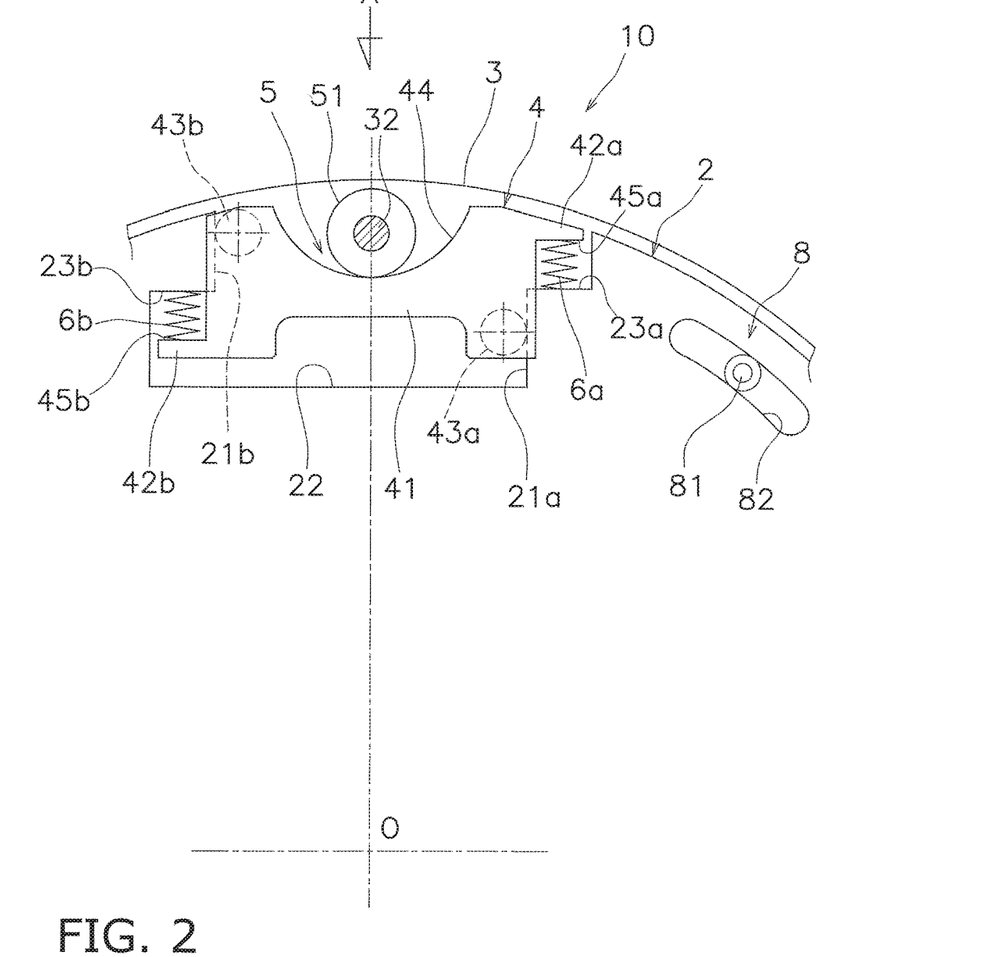
FIG. 2 is an enlarged view of a torque fluctuation inhibiting device.
Figure 3:
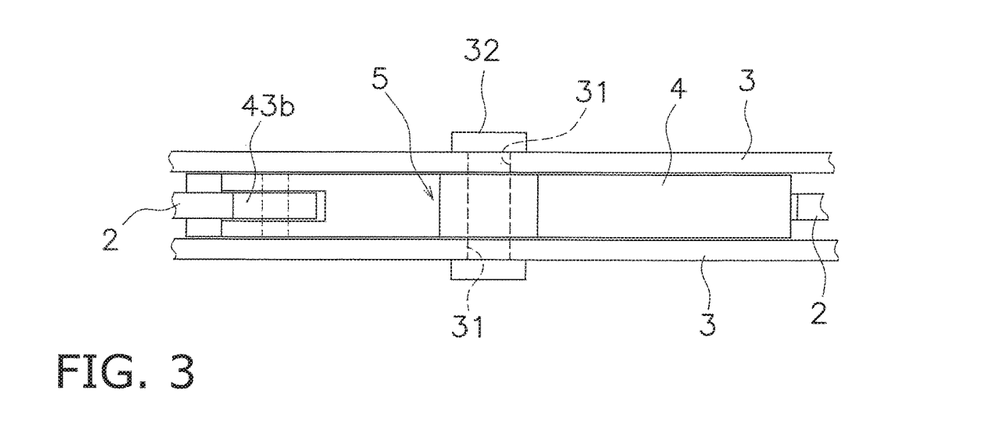
FIG. 3 is a view of FIG. 2 as seen from arrow A.

FIG. 2 is a front view of the torque fluctuation inhibiting device 10. It should be noted that FIG. 2 shows a condition that one of inertia rings (near-side inertia ring) is detached. FIG. 3 is a view of FIG. 2 as seen from a direction A. The torque fluctuation inhibiting device 10 is shown in part in FIG. 2, but as a whole, is composed of a plurality of parts, each of which corresponds to the part shown in FIG. 2 and is disposed in each of a plurality of (e.g., four) positions located at equal angular intervals in the circumferential direction. The part disposed in one of the positions will be hereinafter explained.

As shown in FIGS. 2 and 3, the torque fluctuation inhibiting device 10 includes the hub flange 2 (exemplary first rotor), a pair of inertia rings 3 (exemplary second rotor), the centrifugal element 4, a cam mechanism 5, a first urging member 6a and a second urging member 6b.

<Hub Flange 2>

The hub flange 2 is disposed to be rotatable. The hub flange 2 is disposed in axial opposition to the input-side rotor 131. The hub flange 2 is rotatable relative to the input-side rotor 131. The hub flange 2 is coupled to the output hub 14. In other words, the hub flange 2 is unitarily rotated with the output hub 14.

The hub flange 2 has an annular shape. The hub flange 2 is coupled at the inner peripheral part thereof to the output hub 14. The hub flange 2 includes first and second guide surfaces 21a and 21b. The first and second guide surfaces 21a and 21b are flat surfaces facing the circumferential direction. Specifically, the first and second guide surfaces 21a and 21b face a right-and-left direction in FIG. 2. The first and second guide surfaces 21a and 21b extend in the radial direction. Specifically, the first and second guide surfaces 21a and 21b extend in an up-and-down direction in FIG. 2. Preferably, the first and second guide surfaces 21a and 21b extend substantially in parallel to each other.

The hub flange 2 is provided with a recessed portion 22 in the outer peripheral part thereof. The recessed portion 22 is opened radially outward. The recessed portion 22 is shaped to be opened radially outward and has a predetermined depth. The recessed portion 22 is defined by inner wall surfaces. One pair of the inner wall surfaces, facing in the circumferential direction, corresponds to the first and second guide surfaces 21a and 21b.

Additionally, the hub flange 2 includes first and second installation surfaces 23a and 23b. The first installation surface 23a faces radially outward, whereas the second installation surface 23b faces radially inward.

<Inertia Rings 3>

Each inertia ring 3 is an annular plate. Detailedly, each inertia ring 3 has a continuous annular shape. The pair of inertia rings 3 functions as a mass body of the torque fluctuation inhibiting device 10. The pair of inertia rings 3 is disposed to interpose the hub flange 2 therebetween. The pair of inertia rings 3 is disposed axially on the both sides of the hub flange 2 such that a predetermined gap is produced between the hub flange 2 and each inertia ring 3. In other words, the hub flange 2 and the pair of inertia rings 3 are disposed in axial alignment. The pair of inertia rings 3 has a rotational axis common to the hub flange 2. The pair of inertia rings 3 is rotatable with the hub flange 2, and is also rotatable relative to the hub flange 2.

Each inertia ring 3 is provided with a hole 31 axially penetrating therethrough. Additionally, the pair of inertia rings 3 is fixed to each other by a rivet 32 that penetrates the holes 31 thereof. Therefore, the pair of inertia rings 3 are axially, radially and circumferentially immovable relative to each other.

<Centrifugal Element 4>

The centrifugal element 4 includes a centrifugal element body 41, a first arm portion 42a and a second arm portion 42b. The first and second arm portions 42a and 42b circumferentially extend from the centrifugal element body 41. The first and second arm portions 42a and 42b extend opposite from each other.

Additionally, the centrifugal element 4 includes first and second pressure receiving surfaces 45a and 45b. The first pressure receiving surface 45a receives an urging force applied from the first urging member 6a, whereas the second pressure receiving surface 45b receives an urging force applied from the second urging member 6b. The first pressure receiving surface 45a faces radially inward, whereas the second pressure receiving surface 45b faces radially outward. The first pressure receiving surface 45a is provided on the first arm portion 42a, whereas the second pressure receiving surface 45b is provided on the second arm portion 42b. The first pressure receiving surface 45a is opposed to the first installation surface 23a in a condition without installation of the first urging member 6a. Likewise, the second pressure receiving surface 45b is opposed to the second installation surface 23b in a condition without installation of the second urging member 6b.

The centrifugal element 4 is attached to the hub flange 2. Detailedly, the centrifugal element 4 is disposed in the recessed portion 22 of the hub flange 2. The centrifugal element 4 is disposed in the recessed portion 22 so as to be movable in the radial direction. The centrifugal element 4 is movable in the radial direction by a centrifugal force acting thereon in rotation of the hub flange 2.

The centrifugal element 4 is movable in the radial direction along the first and second guide surfaces 21a and 21b. Detailedly, the centrifugal element 4 is movable in the radial direction along the first and second guide surfaces 21a and 21b through first and second guide rollers 43a and 43b.

The centrifugal element 4 includes the first and second guide rollers 43a and 43b (exemplary support member). The first and second guide rollers 43a and 43b are rotatably attached to the centrifugal element body 41. The first guide roller 43a makes contact with the first guide surface 21a. The second guide roller 43b makes contact with the second guide surface 21b. When the centrifugal element 4 is moved in the radial direction, the first guide roller 43a is rolled on the first guide surface 21a, whereas the second guide roller 43b is rolled on the second guide surface 21b. Accordingly, the centrifugal element 4 can be smoothly moved in the radial direction.

The centrifugal element 4 includes a cam surface 44. The cam surface 44 is made in the shape of a circular arc recessed radially inward as seen in a front view (as seen along the axial direction). It should be noted that the cam surface 44 is the outer peripheral surface of the centrifugal element 4. As described below, the cam surface 44 of the centrifugal element 4 functions as a cam of the cam mechanism 5.

<Urging Members>

The first and second urging members 6a and 6b urge the centrifugal element 4. Detailedly, the first urging member 6a urges the first arm portion 42a of the centrifugal element 4. On the other hand, the second urging member 6b urges the second arm portion 42b of the centrifugal element 4.

The first urging member 6a is disposed between the first installation surface 23a and the first pressure receiving surface 45a. On the other hand, the second urging member 6b is disposed between the second installation surface 23b and the second pressure receiving surface 45b. The first and second urging members 6a and 6b are, for instance, coil springs. The first and second urging members 6a and 6b are each installed in a compressed state.

In stop of the torque fluctuation inhibiting device 10, the urging force of the first urging member 6a can be set to be greater than that of the second urging member 6b. In other words, a preload applied to the centrifugal element 4 from the first urging member 6a is greater than that applied to the centrifugal element 4 from the second urging member 6b. Specifically, the preload applied from the first urging member 6a is preferably set to be greater than that applied from the second urging member 6b by the own weight of the centrifugal element 4. It should be noted that when a plurality of first urging members 6a and a plurality of second urging members 6b are installed, the sum of the preloads applied from the plural first urging member 6a is preferably set to be greater than that of preloads applied from the plural second urging member 6b by the own weight of the centrifugal element 4. The preload of the first urging member 6a and that of the second urging member 6b can be equal in magnitude.

A direction of urging by the first urging member 6a and a direction of urging by the second urging member 6b are oriented opposite from each other. Detailedly, the first urging member 6a and the second urging member 6b urge the centrifugal element 4 to radially opposite sides. The first urging member 6a urges the centrifugal element 4 radially outward, whereas the second urging member 6b urges the centrifugal element 4 radially inward. Because of this, the urging forces acting on the centrifugal element 4 from the first and second urging members 6a and 6b are radially canceled out against each other.

The first and second urging members 6a and 6b urge the centrifugal element 4 such that rotational moments of inertia are applied therefrom to the centrifugal element 4. In other words, a line of action of the urging force applied from the first urging member 6a and that of the urging force applied from the second urging member 6b are not matched with each other. In the present preferred embodiment, the first and second urging members 6a and 6b urge the centrifugal element 4 such that the centrifugal element 4 rotates in the counterclockwise direction in FIG. 2.

Thus, the centrifugal element 4 rotates when the rotational moments of inertia are applied thereto from the first and second urging members 6a and 6b. In other words, the first and second urging members 6a and 6b rotate the centrifugal element 4 toward the first and second guide surfaces 21a and 21b. As a result, the centrifugal element 4 makes contact with the first and second guide surfaces 21a and 21b of the hub flange 2 without any gaps. Detailedly, the first guide roller 43a of the centrifugal element 4 makes contact with the first guide surface 21a without any gap. On the other hand, the second guide roller 43b of the centrifugal element 4 makes contact with the second guide surface 21b without any gap.

<Cam Mechanism 5>

When relative displacement is produced between the hub flange 2 and the inertia rings 3 in the circumferential direction while the centrifugal force is acting on the centrifugal element 4, the cam mechanism 5 is configured to convert the centrifugal force into a circumferential force directed to reduce the relative displacement.

The cam mechanism 5 is composed of a cam follower 51 and the cam surface 44 of the centrifugal element 4. It should be noted that the cam surface 44 of the centrifugal element 4 functions as the cam of the cam mechanism 5. The cam follower 51 is attached to a trunk of the rivet 32. In other words, the cam follower 51 is supported by the rivet 32. It should be noted that the cam follower 51 is preferably attached to the rivet 32 in a rotatable manner, but alternatively, can be attached thereto in a non-rotatable manner. The cam surface 44 is a surface with which the cam follower 51 makes contact, and is made in the shape of a circular arc as seen in the axial direction. The cam follower 51 is moved along the cam surface 44 when the hub flange 2 and the inertia rings 3 are rotated relative to each other within a predetermined angular range.

When rotational phase difference is produced between the hub flange 2 and the inertia rings 3 by the contact between the cam follower 51 and the cam surface 44, the centrifugal force generated in the centrifugal element 4 is converted into the circumferential force by which the rotational phase difference is reduced.

<Stopper Mechanism>

The torque fluctuation inhibiting device 10 further includes a stopper mechanism 8. The stopper mechanism 8 restricts an angular range of relative rotation between the hub flange 2 and the inertia rings 3. The stopper mechanism 8 includes a stop pin 81 and an elongated hole 82.

The stop pin 81 is fixed to the pair of inertia rings 3. The stop pin 81 couples the pair of inertia rings 3 to each other. The elongated hole 82 extends in the circumferential direction. The elongated hole 82 is provided in the hub flange 2. The elongated hole 82 is disposed between adjacent two of the recessed portions 22. The stop pin 81 penetrates the elongated hole 82 in the axial direction. It should be noted that the stop pin 81 can be fixed to the hub flange 2, whereas a pair of elongated holes 82 can be provided in the pair of inertia rings 3.

[Actuation of Torque Fluctuation Inhibiting Device]

Actuation of the torque fluctuation inhibiting device 10 will be explained with FIGS. 2 and 4.

In the lock-up on state, a torque transmitted to the front cover 11 is transmitted to the hub flange 2 through the input-side rotor 131 and the damper 132.

When torque fluctuations do not exist in torque transmission, the hub flange 2 and the inertia rings 3 are rotated in the condition shown in FIG. 2. In this condition, the cam follower 51 in the cam mechanism 5 makes contact with the radial innermost position (circumferential middle position) of the cam surface 44. Additionally in this condition, the rotational phase difference between the hub flange 2 and the inertia rings 3 is "0".

As described above, the circumferential relative displacement between the hub flange 2 and the inertia rings 3 is referred to as "rotational phase difference". In FIGS. 2 and 4, these terms indicate displacement between the circumferential middle position of the centrifugal element 4 and the cam surface 44 and the center position of the cam follower 51.

Figure 4:
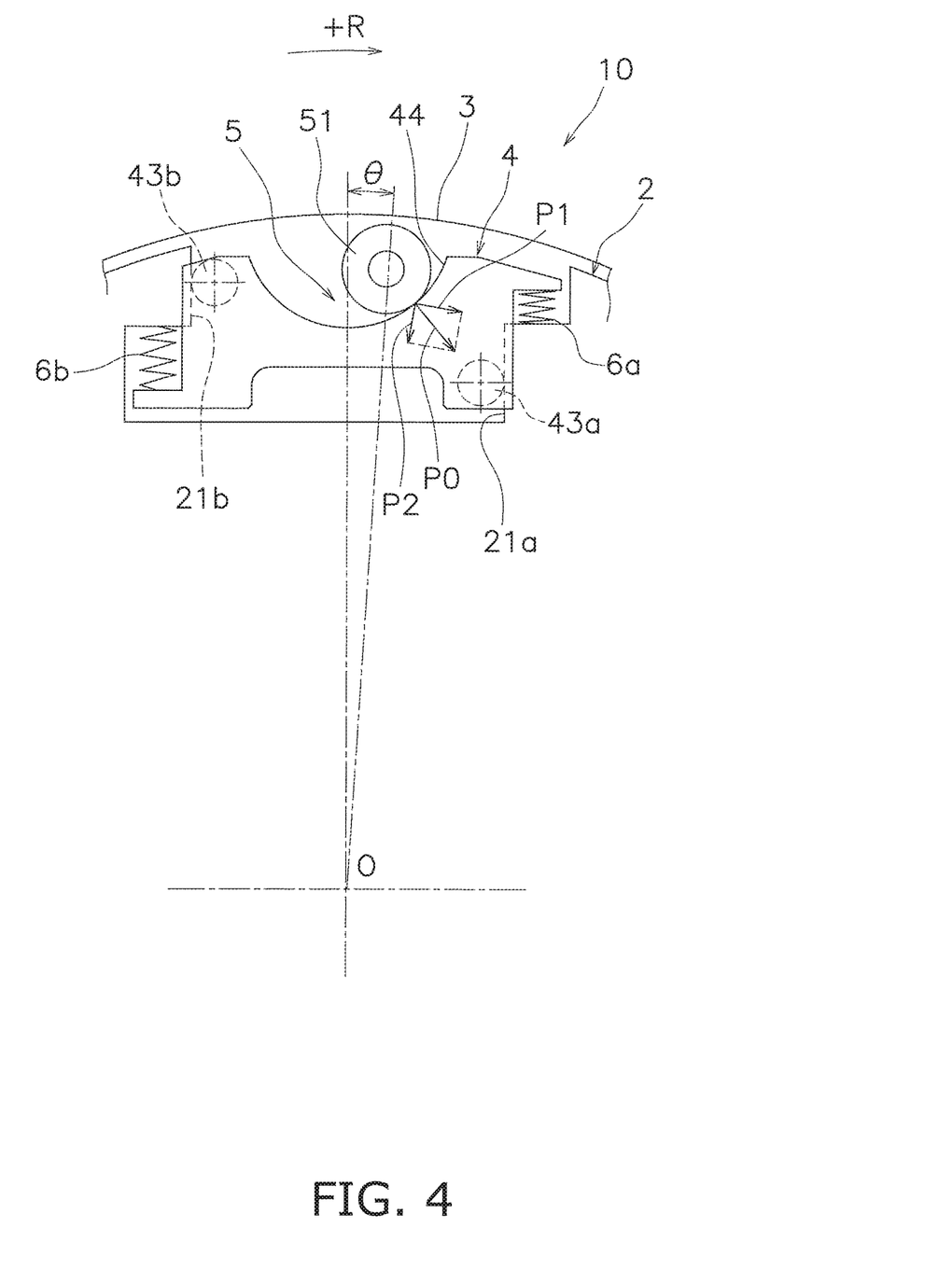
FIG. 4 is an enlarged view of the torque fluctuation inhibiting device in fluctuations in torque inputted thereto.

When torque fluctuations herein exist in torque transmission, rotational phase difference θ is produced between the hub flange 2 and the inertia rings 3 as shown in FIG. 4. FIG. 4 shows a condition that rotational phase difference +θ (e.g., 5 degrees) is produced to a +R side.

As shown in FIG. 4, when the rotational phase difference +θ is produced between the hub flange 2 and the inertia rings 3, the com follower 51 in the cam mechanism 5 is relatively moved along the cam surface 44 to the right side of FIG. 4. At this time, a centrifugal force acts on the centrifugal element 4. Hence, a reaction force to be received by the cam surface 44 provided on the centrifugal element 4 from the cam follower 51 has a direction and a magnitude indicated by P0 in FIG. 4. A first force component P1 and a second force component P2 are produced by the reaction force P0. The first force component P1 is directed in the circumferential direction, whereas the second force component P2 is directed to move the centrifugal element 4 radially inward.

Additionally, the first force component P1 acts as a force to move the hub flange 2 rightward in FIG. 4 through the cam mechanism 5 and the centrifugal element 4. In other words, a force directed to reduce the rotational phase difference between the hub flange 2 and the inertia rings 3 is supposed to act on the hub flange 2. On the other hand, the second force component P2 moves the centrifugal element 4 to the inner peripheral side against the centrifugal force.

It should be noted that when the rotational phase difference is reversely produced, the cam follower 51 is relatively moved along the cam surface 44 to the left side in FIG. 4. However, the aforementioned actuation principle is also true of this case.

As described above, when the rotational phase difference is produced between the hub flange 2 and the inertia rings 3 by torque fluctuations, the hub flange 2 receives a force (first force component P1) directed to reduce the rotational phase difference between the both by the centrifugal force acting on the centrifugal element 4 and the working of the cam mechanism 5. Torque fluctuations are inhibited by this force.

The aforementioned force inhibiting torque fluctuations varies in accordance with the centrifugal force, in other words, the rotational speed of the hub flange 2, and also varies in accordance with the rotational phase difference and the shape of the cam surface 44. Therefore, by suitably setting the shape of the cam surface 44, characteristics of the torque fluctuation inhibiting device 10 can be made optimal in accordance with the specification of the engine and so forth.

For example, the cam surface 44 can be made in a shape that makes the first force component P1 linearly vary in accordance with the rotational phase difference in a condition where the centrifugal force acting is constant. Alternatively, the cam surface 44 can be made in a shape that makes the first force component P1 non-linearly vary in accordance with the rotational phase difference.

During the actuation of the cam mechanism 5 described above, rotational moments of inertia are applied to the centrifugal element 4 by the first and second urging members 6a and 6b, respectively, such that the first and second guide rollers 43a and 43b in the centrifugal element 4 make contact with the first and second guide surfaces 21a and 21b, respectively, without any gaps. Because of this, in actuation of the torque fluctuation inhibiting device 10, the centrifugal element 4 is radially moved while the posture thereof is kept constant. Therefore, the characteristics (especially, torsional characteristics) of the torque fluctuation inhibiting device 10 can be obtained as designed, and can be stabilized.

Moreover, the first urging member 6a urges the centrifugal element 4 radially outward. Because of this, for instance, in low-speed rotation of the torque fluctuation inhibiting device 10 or so forth, the centrifugal element 4 can be prevented from moving radially inward due to the own weight thereof. As a result, it is possible to prevent occurrence of a situation that the centrifugal element 4 collides with the hub flange 2 and hitting sound is thereby produced. Additionally, the centrifugal element 4 is urged radially outward by the first urging member 6a, and is simultaneously urged radially inward by the second urging member 6b. Thus, the urging forces acting on the centrifugal element 4 from the first and second urging members 6a and 6b are oriented opposite from each other, and are thereby canceled out against each other. Because of this, except for the centrifugal force, other forces (urging forces) acting on the centrifugal element 4 are inhibited, whereby degradation in performance of the torque fluctuation inhibiting device 10 can be inhibited.

[Exemplary Characteristics]

Figure 5:
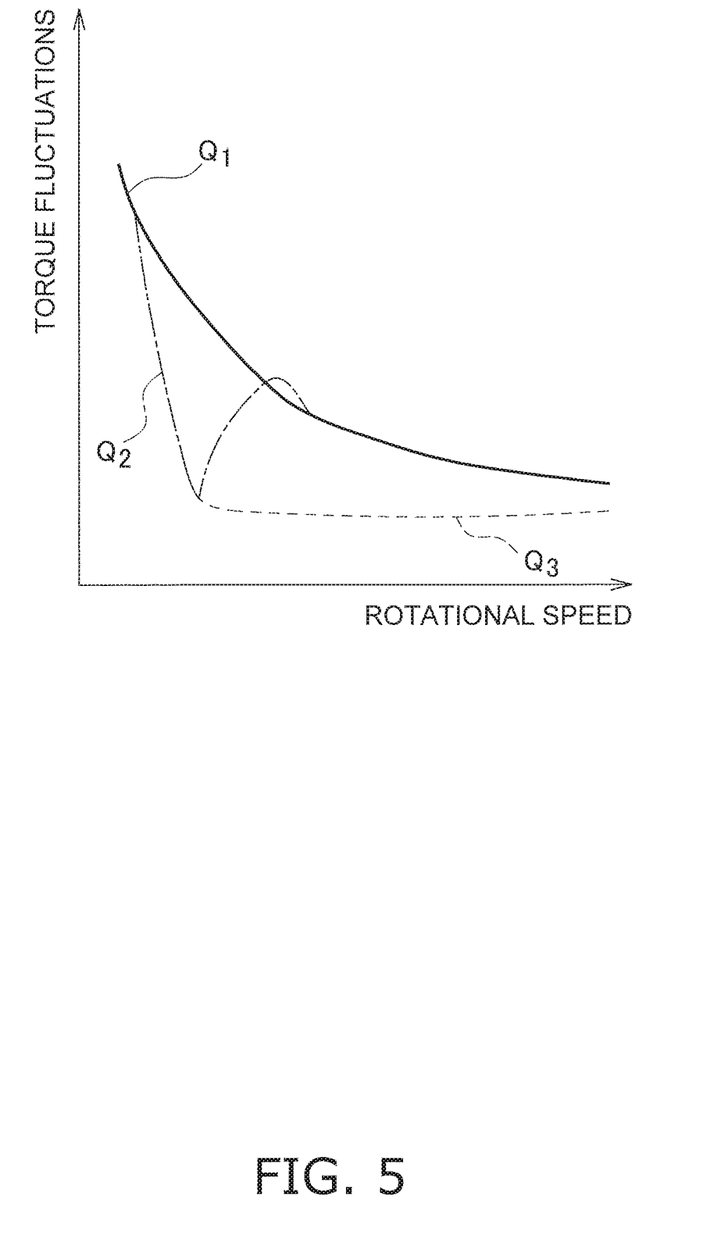
FIG. 5 is a chart showing a relation between rotational speed and torque fluctuations.

FIG. 5 is a diagram showing exemplary characteristics of the torque fluctuation inhibiting device 10. The horizontal axis indicates rotational speed, whereas the vertical axis indicates torque fluctuations (rotational speed fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 10 of the present preferred embodiment.

As is obvious from FIG. 5, in an apparatus in which the well-known dynamic damper device without any cam mechanism is installed (characteristic Q2), torque fluctuations can be inhibited only in a specific rotational speed range. By contrast, in the condition with installation of the torque fluctuation inhibiting device 10 with the cam mechanisms 5 of the present preferred embodiment (characteristic Q3), torque fluctuations can be inhibited through the entire rotational speed ranges.

Modifications

The present invention is not limited to the preferred embodiment described above, and a variety of changes or modifications can be made without departing from the scope of the present invention.

Modification 1

Figure 6:
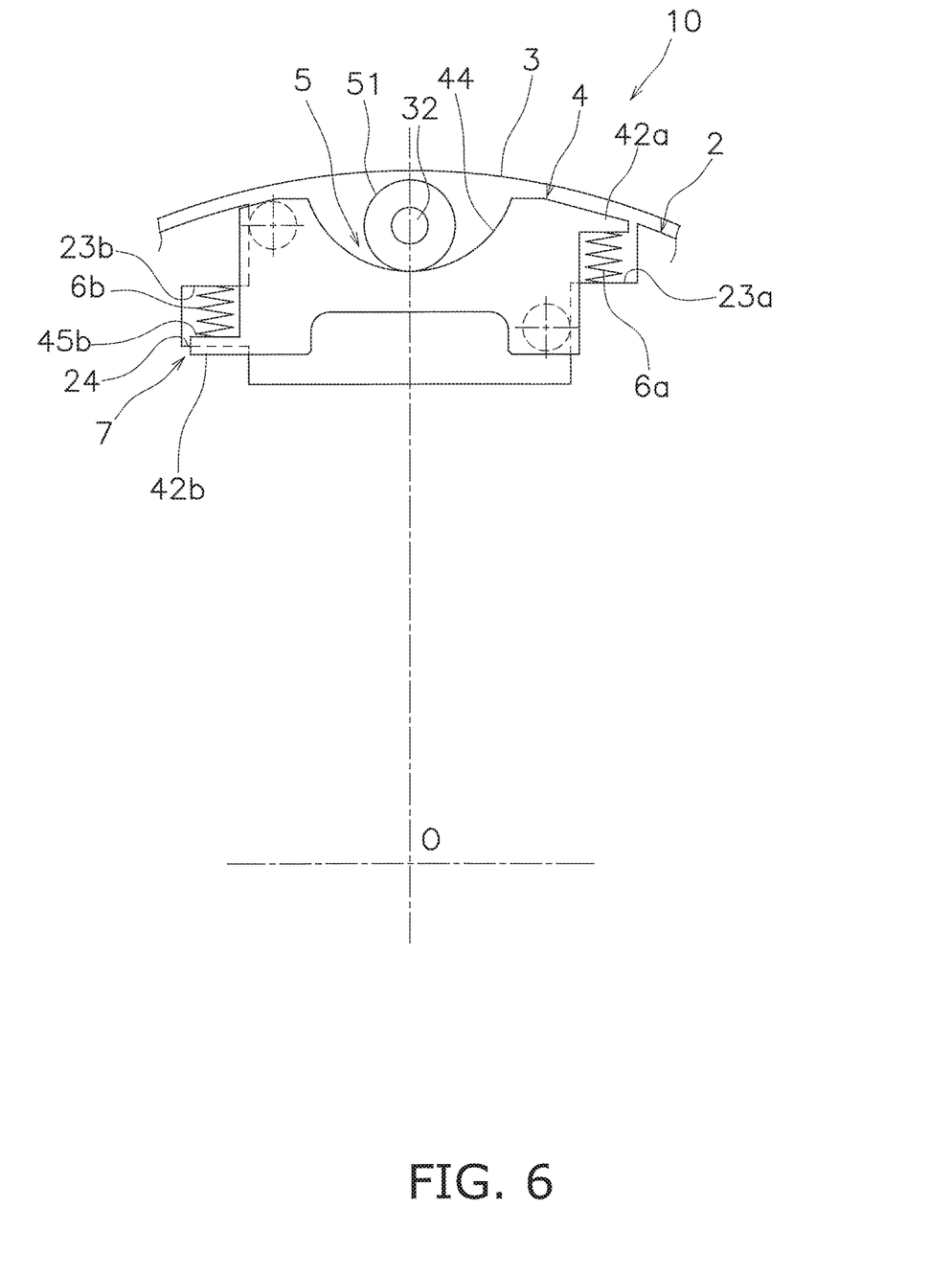
FIG. 6 is an enlarged view of a torque fluctuation inhibiting device according to a modification.

As shown in FIG. 6, the torque fluctuation inhibiting device 10 can further include a block mechanism 7. The block mechanism 7 is configured to block the second urging member 6b from applying an urging force to the centrifugal element 4 when the centrifugal element 4 is moved radially inward more than a predetermined distance.

Detailedly, the block mechanism 7 includes a contact surface 24 provided on the hub flange 2. The contact surface 24 is disposed on the extension of the second urging member 6b in the direction of urging by the second urging member 6b. The contact surface 24 is opposed to the second installation surface 23b in a condition without installation of the second urging member 6b. The contact surface 24 extends substantially in parallel to the second installation surface 23b. The contact surface 24 also extends substantially in parallel to the second pressure receiving surface 45b.

The contact surface 24 is disposed radially inside the second pressure receiving surface 45b in a condition without fluctuations in torque inputted to the torque fluctuation inhibiting device 10, in other words, in a condition without rotational phase difference between the hub flange 2 and the inertia rings 3. Because of this, the contact surface 24 does not make contact with the second urging member 6b, but the second pressure receiving surface 45b makes contact therewith. It should be noted that in normal actuation of the torque fluctuation inhibiting device 10, the contact surface 24 is disposed radially inside the second pressure receiving surface 45b.

When the hub flange 2 and the inertia rings 3 are rotated relative to each other in fluctuations in torque inputted to the torque fluctuation inhibiting device 10, the cam follower 51 presses the centrifugal element 4 radially inward, whereby the centrifugal element 4 is moved radially inward.

Figure 7:
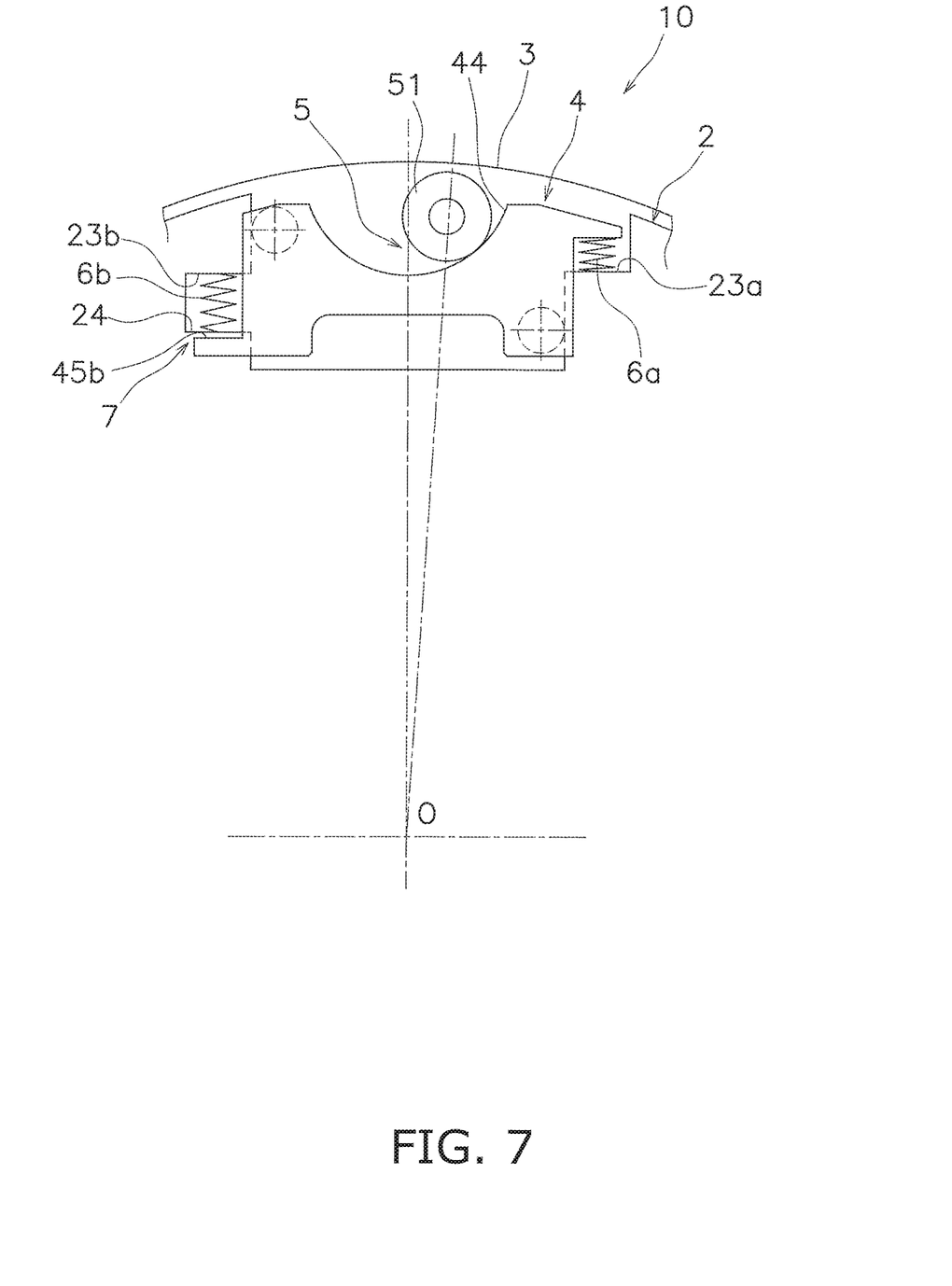
FIG. 7 is an enlarged view of an action of the torque fluctuation inhibiting device according to the modification.

As shown in FIG. 7, when the hub flange 2 and the inertia rings 3 are excessively displaced relative to each other by sudden acceleration, sudden deceleration or so forth, the cam follower 51 presses the centrifugal element 4 radially inward whereby the centrifugal element 4 is moved radially inward more than the predetermined distance. When the centrifugal element 4 is moved radially inward more than the predetermined distance, the second pressure receiving surface 45b is disposed radially inside the contact surface 24. When this positional relation is made, the contact surface 24 is located radially outside the second pressure receiving surface 45b and makes contact with the second urging member 6b, whereas the second pressure receiving surface 45b does not make contact with the second urging member 6b. Therefore, the second pressure receiving surface 45b does not receive an urging force from the second urging member 6b. In other words, the second urging member 6b is blocked from applying the urging force to the centrifugal element 4.

As described above, when the block mechanism 7 blocks the second urging member 6b from applying the urging force to the centrifugal element 4, a radially inward load acting on the centrifugal element 4 is reduced in magnitude. In other words, a radially outward load acting on the centrifugal element 4 (the centrifugal force and the urging force of the first urging member 6a) is relatively increased in magnitude. As a result, the centrifugal element 4 is inhibited from being moved radially inward, and the hub flange 2 and the inertia rings 3 can be prevented from being excessively displaced relative to each other. Because of this, it is possible to prevent hitting sound from being produced in the stopper mechanism 8.

Figure 8:
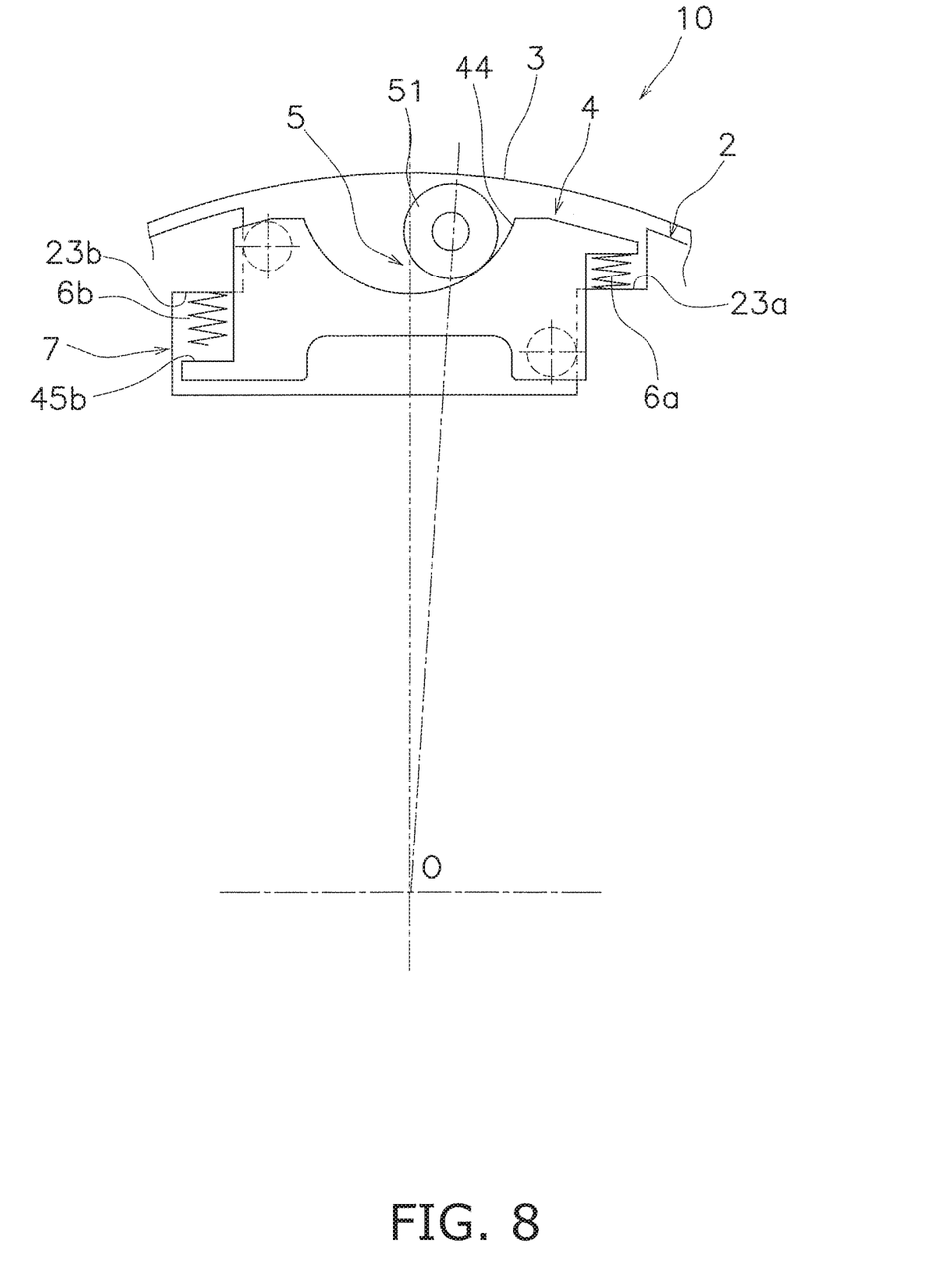
FIG. 8 is an enlarged view of an action of a torque fluctuation inhibiting device according to an alternative of the modification.

It should be noted that the block mechanism 7 may not include the contact surface 24. For example, as shown in FIG. 8, the free length of the second urging member 6b can be adjusted such that the second urging member 6b is configured to be separated from the second pressure receiving surface 45b of the centrifugal element 4 when the centrifugal element 4 is moved radially inward more than the predetermined distance. Thus, when separated from the second pressure receiving surface 45b, the second urging member 6b can be blocked from applying the urging force to the centrifugal element 4.

Modification 2

Figure 9:
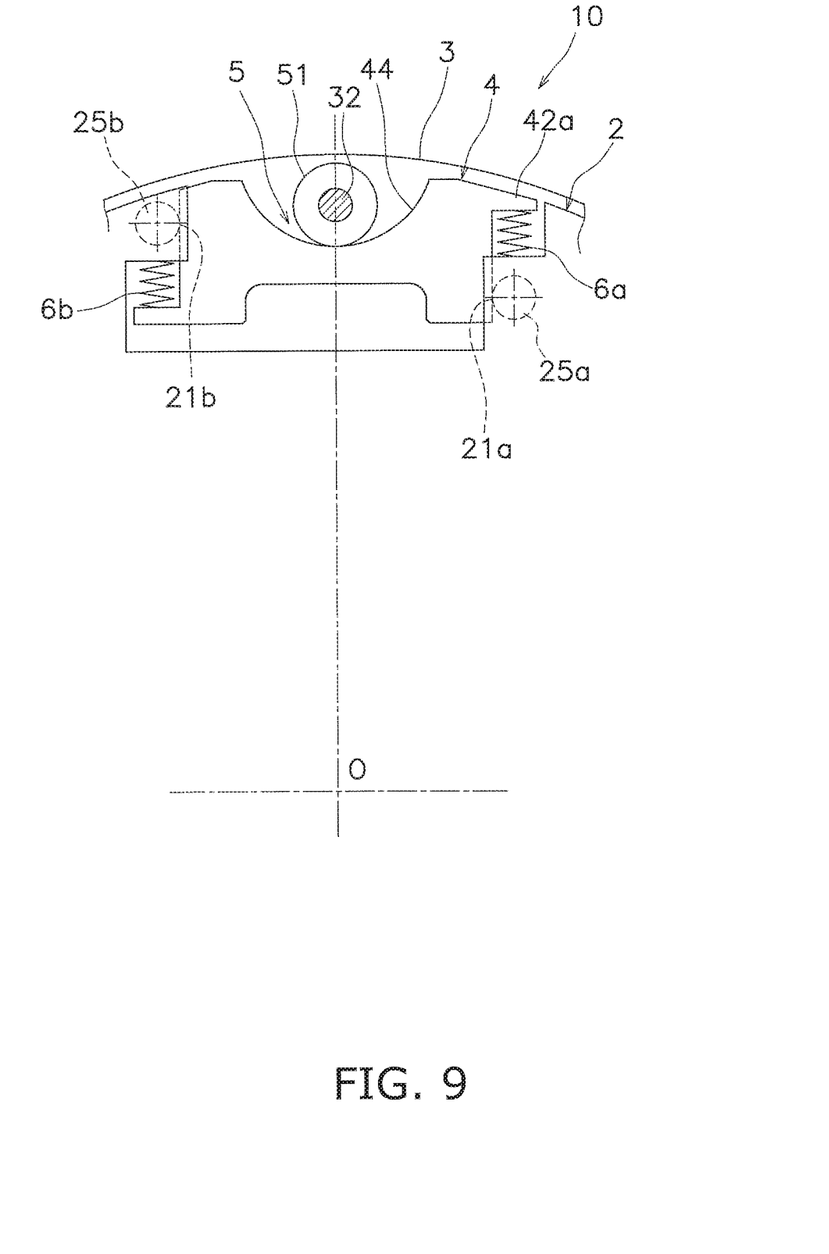
FIG. 9 is an enlarged view of a torque fluctuation inhibiting device according to another modification.

In the aforementioned preferred embodiment, the centrifugal element 4 includes the guide rollers 43a and 43b. However, the centrifugal element 4 may not include the first and second guide rollers 43a and 43b. In this case, for instance, as shown in FIG. 9, the hub flange 2 preferably includes first and second guide rollers 25a and 25b. It should be noted that the outer peripheral surfaces of the first and second guide rollers 25a and 25b form in part the first and second guide surfaces 21a and 21b.

Modification 3

In the aforementioned preferred embodiment, the first and second guide rollers 43a and 43b are exemplified as guide members. However, the guide members are not limited to the above. For example, the guide members can be another type of members such as resin sheets for reducing friction between the centrifugal element 4 and the first and second guide surfaces 21a and 21b.

Modification 4

In the aforementioned preferred embodiment, the hub flange 2 is provided with the centrifugal elements 4. Alternatively, the inertia rings 3 can be provided with the centrifugal elements 4. In this case, the inertia rings 3 correspond to the first rotor of the present invention, whereas the hub flange corresponds to the second rotor of the present invention.

Modification 5

In the aforementioned preferred embodiment, the first and second guide surfaces 21a and 21b are composed of the inner wall surfaces of the recessed portions 22. However, the guide surfaces are not limited to the above as long as the guide surfaces are capable of guiding radial movement of each centrifugal element 4.

Modification 6

In the aforementioned preferred embodiment, the coil springs are exemplified as the first and second urging members. However, the first and second urging members are not limited to the coil springs. For example, the first and second urging members can be plate springs or another type of elastic members.

Modification 7

In the aforementioned preferred embodiment, the hub flange 2 is exemplified as the first rotor. However, the first rotor is not limited to the above. For example, when a torque fluctuation inhibiting device is attached to a torque converter as configured in the present preferred embodiment, the front cover 11, the input-side rotor 131 or so forth can be set as the first rotor in the torque converter 100.

Modification 8

In the aforementioned preferred embodiment, the torque fluctuation inhibiting device 10 is attached to the torque converter 100. Alternatively, the torque fluctuation inhibiting device 10 can be attached to another type of power transmission device such as a clutch device.

REFERENCE SIGNS LIST

2 Hub flange
21a First guide surface
21b Second guide surface
3 Inertia ring
4 Centrifugal element
41 Centrifugal element body
42a First arm portion
42b Second arm portion
43a First guide roller
43b Second guide roller
5 Cam mechanism
6a First urging member
6b Second urging member
7 Block mechanism
10 Torque fluctuation inhibiting device

What is claimed is:
1. A rotary device comprising:
a first rotor including a guide surface, the first rotor disposed to be rotatable;
a centrifugal element attached to the first rotor, the centrifugal element radially movable along the guide surface by a centrifugal force acting thereon in rotation of the first rotor;
a first urging member configured to urge the centrifugal element radially outward; and a second urging member configured to urge the centrifugal element radially inward in a direction opposite to a direction of urging by the first urging member, wherein the first and second urging members are further configured to rotate the centrifugal element toward the guide surface.

2. A rotary device comprising:

a first rotor including a guide surface, the first rotor disposed to be rotatable;

a second rotor disposed to be rotatable with the first rotor and be rotatable relative to the first rotor;

a centrifugal element attached to the first rotor, the centrifugal element radially movable along the guide surface by a centrifugal force acting thereon in rotation of the first rotor;

a first urging member configured to urge the centrifugal element; and a second urging member configured to urge the centrifugal element in a direction opposite to a direction of urging by the first urging member; and a cam mechanism configured to receive the centrifugal force acting on the centrifugal element, the cam mechanism further configured to convert the centrifugal force into a circumferential force when a relative displacement is produced between the first rotor and the second rotor in a circumferential direction, the circumferential force directed to reduce the relative displacement, wherein the first and second urging members are further configured to rotate the centrifugal element toward the guide surface.

3. The rotary device according to claim 1, wherein the centrifugal element includes a guide member, the guide member making contact with the guide surface.

4. The rotary device according to claim 1, wherein the first rotor includes a guide member, the guide member in part forming the guide surface.

5. The rotary device according to claim 1, wherein the centrifugal element includes:

a centrifugal element body, a first arm portion extending from the centrifugal element body, and a second arm portion extending from the centrifugal element body in a direction opposite to an extending direction of the first arm portion, the first urging member is further configured to urge the first arm portion, and the second urging member is further configured to urge the second arm portion.

6. The rotary device according to claim 1, further comprising:

a block mechanism configured to block the second urging member from applying an urging force to the centrifugal element when the centrifugal element is moved radially inward more than a predetermined distance.

* * * * *